(12) United States Patent
Vollmer et al.

(10) Patent No.: US 6,386,571 B1
(45) Date of Patent: May 14, 2002

(54) SIDE STRUT FOR A LOWER STEERING ARM OF A TRACTOR

(75) Inventors: Jürgen Vollmer, Lohmar; Gunter Wagner, Wolfhagen, both of (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/663,475

(22) Filed: Sep. 15, 2000

(30) Foreign Application Priority Data

Sep. 17, 1999 (DE) .......................................... 199 44 749

(51) Int. Cl.⁷ ................................................. B60D 1/32
(52) U.S. Cl. ..................... 280/455.1; 280/432; 172/450
(58) Field of Search ................................. 172/450, 446, 172/677, 678; 280/455.1, 432, 447, 457, 462, 463

(56) References Cited

U.S. PATENT DOCUMENTS

| | | | |
|---|---|---|---|
| 2,878,043 A | | 3/1959 | Edman et al. |
| 3,124,371 A | * | 3/1964 | Weir |
| 3,425,715 A | * | 2/1969 | Weitz |
| 4,564,073 A | * | 1/1986 | Ide et al. .................... 172/120 |
| 4,865,134 A | * | 9/1989 | Rugen et al. ............... 172/450 |
| 5,361,850 A | * | 11/1994 | Muller et al. ............... 172/450 |
| 5,462,303 A | * | 10/1995 | Langen et al. ........... 280/455.1 |
| 5,823,271 A | * | 10/1998 | Muller et al. ............... 172/450 |
| 6,089,328 A | * | 7/2000 | Moore et al. ............... 172/447 |
| 6,131,937 A | * | 10/2000 | Coenen .................... 280/455.1 |

FOREIGN PATENT DOCUMENTS

| | | |
|---|---|---|
| DE | 1273891 | 7/1968 |
| DE | 197 44 328 C1 | 10/1998 |
| DE | 197 37 318 A1 | 3/1999 |

* cited by examiner

Primary Examiner—Avraham H. Lerner
(74) Attorney, Agent, or Firm—Harness, Dickey & Pierce, P.L.C.

(57) ABSTRACT

A side strut (5) for a lower steering arm of a tractor has a single-action hydraulic cylinder and a setting unit with a hollow cylinder (17) and an adjustable setting element 20. The setting element (20) includes a threaded bore (30) which receives a threaded rod (32). The hydraulic cylinder has a first attaching element (6) to connect to a tractor. The threaded rod (32) has a second attaching element (7) to connect a lower steering arm. In the fully moved-out position of the hydraulic cylinder, the setting element (20) is rotatable by an actuating lever (33). Thus, the threaded rod (32) moves in and out. To prevent any rotation, a first holding element (36) is provided. The actuating lever (33) engages the holding element in a rest position. A second holding element (37) is provided to ensure, in those cases where the hydraulic cylinder is in a position other than the fully moved-out position, that the actuating lever (33) is held to prohibit a rotational movement of the setting element (20) relative to the hollow cylinder. The rotational movement would effect a change in the length setting.

14 Claims, 4 Drawing Sheets

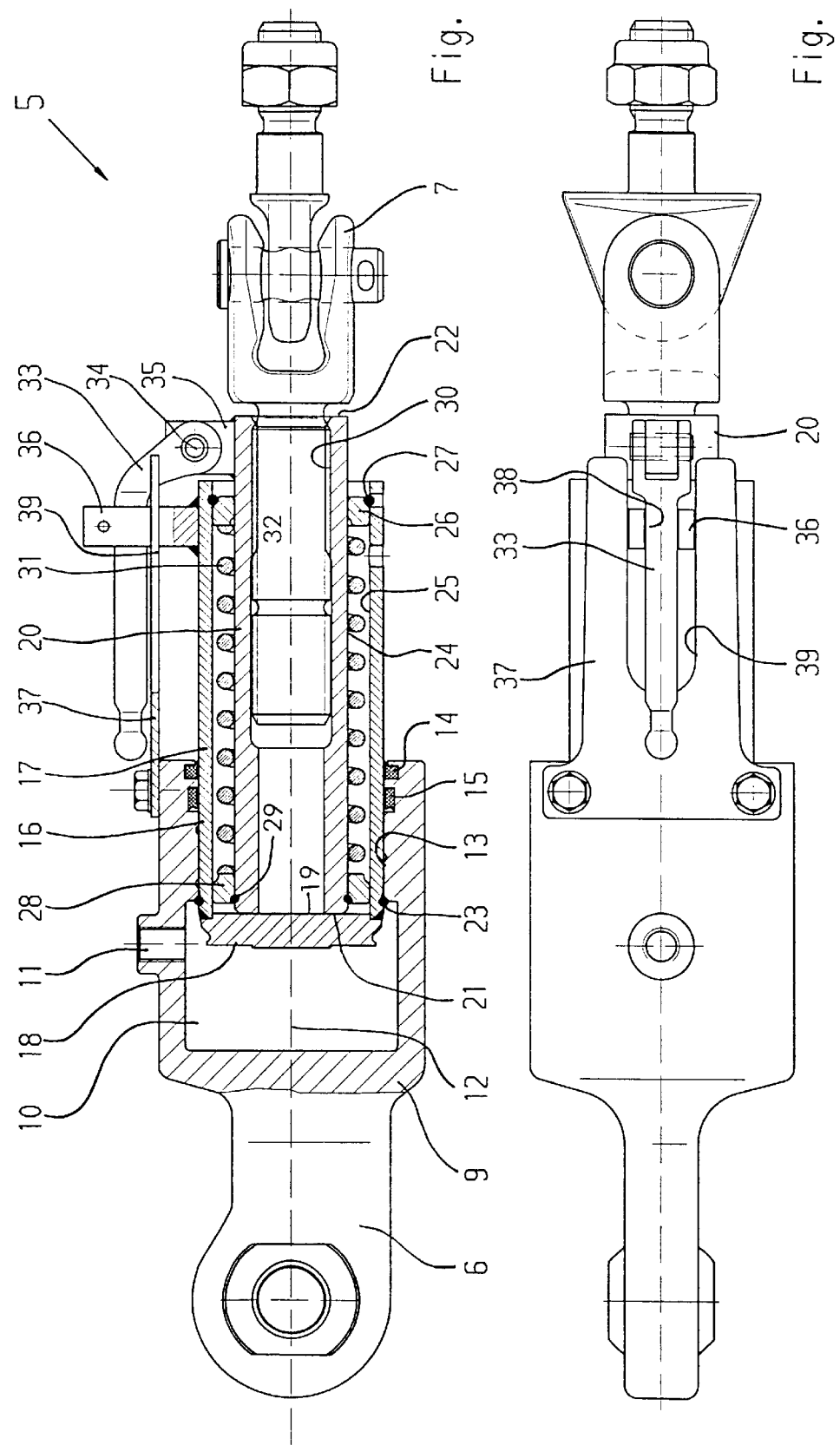

SIDE STRUT FOR A LOWER STEERING ARM OF A TRACTOR

CROSS-REFERENCE TO RELATED APPLICATIONS

This application is based upon and claims priority to German Patent Application 199 44 749.7 filed Sep. 17, 1999.

BACKGROUND OF THE INVENTION

The invention relates to a side strut for a lower steering arm of a tractor. Side struts are used for at least temporarily stabilizing the laterally pivotable lower steering arms of a tractor. Also, side struts prevent the lower steering arms from being pivoted. Further, the side struts are designed such that when an implement is lifted, the implement, as well as the lower steering arms, are automatically centered centrally relative to the longitudinal axis of the tractor. Furthermore, the side struts serve to hold the lower steering arms at a predetermined distance from one another in accordance with the category of the to be attached implement, thus enabling the implement to be coupled automatically from the driver's seat.

DE 197 44 328 C1 describes a side strut which can be used for the lower steering arms of a tractor. It has a single-action hydraulic cylinder provided with a piston and a cylinder housing. The end of the piston rod associated with the piston projects from the cylinder housing. This end carries a first attaching means which is connected to corresponding attaching means at the rear of the tractor.

The cylinder housing is axially followed by a hollow cylinder. An adjustable rod-shaped setting element is arranged in the cylinder. The rod-shaped setting element is guided in the hollow cylinder by two spaced guiding rings. Also, a pressure spring is arranged between the guiding rings. The spring is loaded into a moved-in position where the setting element, via one end face, is supported against the base of the cylinder housing. The piston and the setting element can be moved out in opposite directions. The end of the setting element, which projects from the hollow cylinder when the setting element is moved in, includes a threaded bore. The threaded bore is engaged by a threaded rod. A second attaching means is attached to the threaded rod and is connectable to the associated lower steering arm. The pivoting path of the lower steering arm is restricted for the installation conditions prevailing in modern tractors. Here, the basic axial length resulting from arranging the cylinder housing, the hollow cylinder, and the setting device for the category setting means with the threaded bore and the threaded bar one behind the other is too great.

There is a further disadvantage in that, when actuating the setting element, a position, once set, is not secured. This is due to the fact that during operation, it is possible for the setting element to unintentionally rotate. This rotation leads to a change in length.

SUMMARY OF THE INVENTION

It is an object of the invention to provide a side strut which enables the basic length set for a certain category or for a certain implement by the threaded rod to remain set for as long as required. Accordingly, the length does not change automatically under operational conditions. Furthermore, it is an object of the present invention to provide a side strut where settings can only be effected if the lower steering arms are in the centered position.

In accordance with the invention, a side strut includes a single-action hydraulic cylinder with a piston and a cylinder housing. A setting unit is provided with a hollow cylinder with a longitudinal axis; a rod-shaped setting element is adjustable in the hollow cylinder along the longitudinal axis between a moved-in and a moved-out position; the rod-shaped setting element includes a threaded bore centered on the longitudinal axis; the bore starts from a second end face projecting from the hollow cylinder. The setting unit, furthermore, includes an actuating lever attached to an end of the setting element. The end projects from the hollow cylinder. The setting unit also has a first holding element attached on the outside to the end of the hollow cylinder removed from the cylinder housing. The actuating lever can be brought into an operational relationship with the holding element to prevent a rotation of the setting element relative to the hollow cylinder. However, the holding element enables a relative adjustment of the lever relative to one another along the longitudinal axis. An adjustable threaded rod is received in the threaded bore of the setting element. A second holding element is secured to one of the components of the hydraulic cylinder. The second holding element holds the first holding element so as to be non-rotatable relative to the component and relatively adjustable thereto along the longitudinal axis. Further, the second holding element, in a position deviating from the fully moved-out position of the piston, non-rotatably holds the setting element.

The advantage of this design is that relative to both, the hollow cylinder and the cylinder housing and piston, the setting element cannot carry out a rotary movement around the longitudinal axis outside the design-related rotational play. In addition, it is ensured that the threaded connection between the threaded bore of the setting element and the threaded rod cannot be adjusted unless the piston, relative to the cylinder, is in a moved-out position. The position corresponds to the centered position of the lower steering arms. In that position, the lower steering arms can be set relative to one another such that they assume the spread-apart width required by the selected implement. In addition, if required, play can be suppressed when the implement is attached.

In a first embodiment, the hollow cylinder forms part of the piston of the hydraulic cylinder. In this embodiment it is advantageous that it is possible to achieve a very compact length for the side strut. However, it is also possible to provide an assembly where the hollow cylinder is connected to the cylinder housing of the hydraulic cylinder. Thus, the assembly is centered on the longitudinal axis with the components arranged one behind the other.

The first embodiment is further characterized in that the second holding element is attached to the cylinder housing. The first holding element is adjustably guided at the second holding element along the longitudinal axis. Also, the first holding element is non-rotatably held around the longitudinal axis.

In a second embodiment, the second holding element is secured to the piston. The first holding element is guided at the second holding element. The first holding element is adjustable along the longitudinal axis and non-rotatably held around the longitudinal axis.

In both embodiments, the actuating lever is attached to the setting element. The lever is pivotable around a pivot axis which intersects the longitudinal axis at a distance. The first holding element is shaped to be yoke-like and includes a yoke opening. The yoke opening is engaged by the actuating lever when the lever is in the rest position. Thus, anti-rotation means are provided which are effective even in those cases where the piston of the single-action hydraulic cylinder is in the moved-out position. The second holding element also ensures that the piston or the cylinder housing cannot carry out a rotational movement relative to the hollow cylinder.

The actuating lever engages a guiding slot when the piston in the cylinder housing assumes a position which deviates from the fully moved-out position. Thus, the setting element is non-rotatably held as long as the piston of the hydraulic cylinder is not in the fully moved-out position.

The second holding element includes a guiding slot to prevent the setting element from rotating relative to the component to which the second holding element is secured. The slot extends parallel to the longitudinal axis. The first holding element is guided in the guiding slot. The guiding slot can also be used for guiding the actuating lever. The slot releases the actuating lever only in the fully moved-out position of the hydraulic cylinder.

There are two basic possibilities for designing the second holding element. First, the second holding element is in the form of a plate metal part arranged parallel to the longitudinal axis. The second holding element projects axially from the cylinder housing. Alternatively, the second holding element is tubular and coaxially arranged around the hollow cylinder. The second holding element may be secured to the piston rod associated with the piston. Also, the second holding element may be secured to the cylinder housing if the telescoped arrangement according to the first embodiment is selected.

From the following detailed description, taken in conjunction with the drawings and subjoined claims, other objects and advantages of the present invention will become apparent to those skilled in the art.

BRIEF DESCRIPTION OF THE DRAWINGS

Preferred embodiments of the invention and the way in which these are associated with the lower steering arms of a tractor will be described with reference to the drawings wherein:

FIG. 2 is a longitudinal cross-section view of a first embodiment of an inventive side strut with the hydraulic cylinder in the moved-out position.

FIG. 3 is a plan view of FIG. 2.

DETAILED DESCRIPTION OF THE PREFERRED EMBODIMENT

Figure 1:
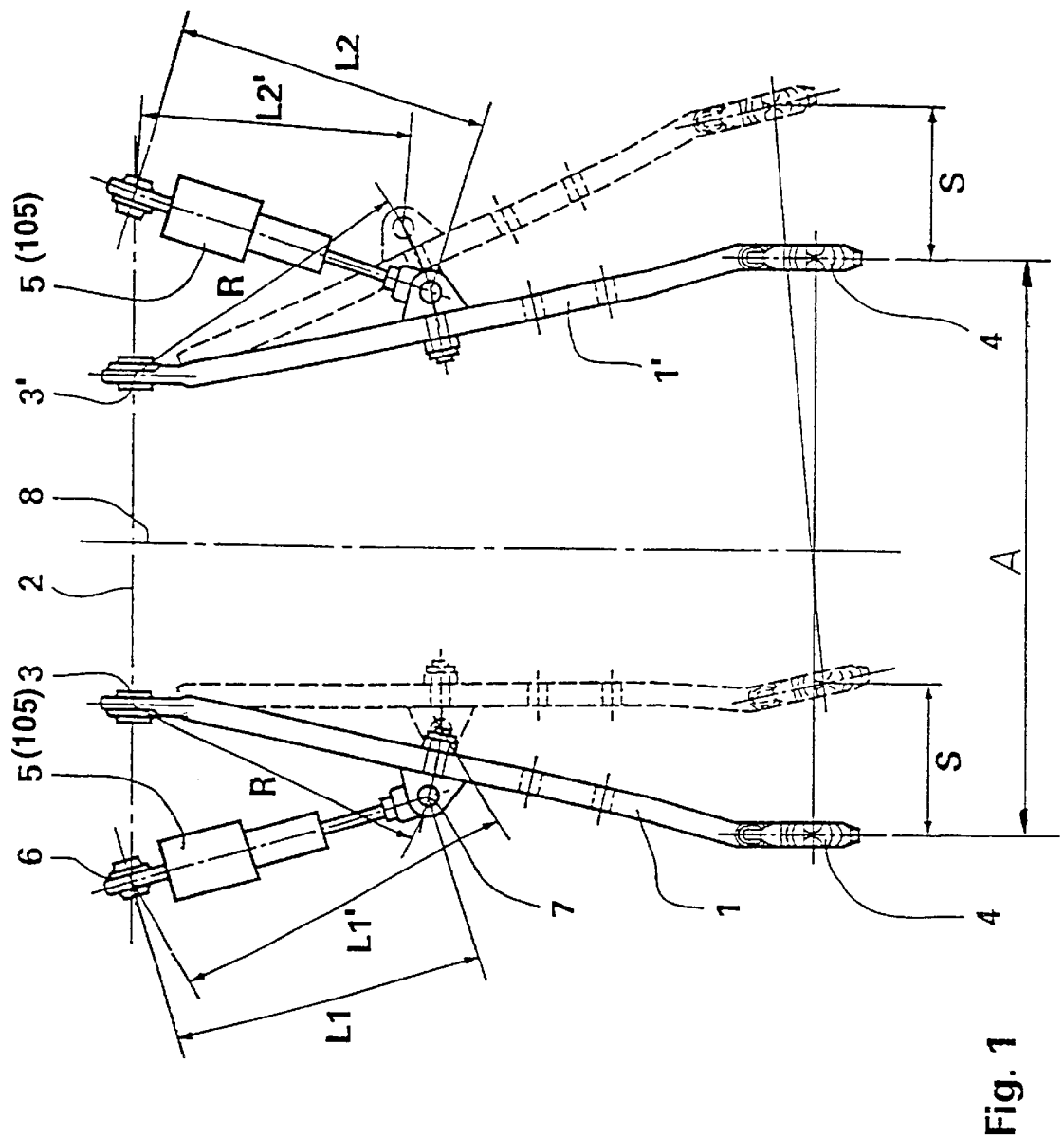
FIG. 1 is a diagrammatic view of the lower steering arms of a three-point attaching device of a tractor with the associated side struts.

FIG. 1 is a plan view of two lower steering arms 1, 1' at the rear of the tractor. The arms 1, 1' are pivotably arranged around a pivot axis 2 by a suitable attaching mechanism at the fixing points 3, 3'. The two fixing points 3, 3' are arranged at identical distances on each side of the longitudinal tractor axis 8. The two lower steering arms 1, 1' are able to carry out both side movements and lifting movements. Thus, the arms move upward and downward, pivoting around the pivot axis 2 out of the drawing plane and into the drawing plane, as can be seen in FIG. 1. For example, lateral pivot movements are by the dimension S out of the position shown in continuous lines into the position shown in dashed lines. The two side struts 5, 105 are used for stabilizing purposes. The struts prevent lateral movements of the two lower steering arms 1, 1'. The two free ends of the lower steering arms 1, 1' are provided with coupling hooks 4. The hooks serve to receive corresponding coupling means at the implement for pulling the implement or for carrying the implement in cooperation with an upper steering arm (not illustrated). The upper steering arm is normally arranged so as to be centered on the longitudinal tractor axis 8 above the pivot axis 2. One end of the two side struts 5, 105 are secured by a first attaching means 6 to a suitable fixing means of the tractor rear which are centered on the pivot axis 2. The struts 5, 105 are laterally offset relative to the fixing points 3, 3'.

The second attaching means 7, at the other end of the side struts 5, 105, connects the side strut 5, 105 to a lower steering arm 1, 1'. The attaching means 6, 7 enable pivotal movement. Furthermore, as seen from FIG. 1, the pivot axes of the attaching means 7 are arranged at a radius R relative to the fixing points 3, 3'. Thus, the attaching means 7 carry out a pivot movement with the radius R.

If, with an attached implement, a side movement S occurs at the two lower steering arms 1, 1', with the two lower steering arms 1, 1' being displaced from the position shown in continuous lines into the position shown in dashed lines, a change occurs in the two lower steering arms 1, 1'. Here, starting from identical distances L1 and L2 between the pivot axes of the articulation points 6, 7, the dimension L1 is increased to L1' for the lower steering arm 1, and dimension L2 is shortened to dimension L2'. The changes in length vary with respect to magnitude. If the lower steering arms 1, 1' are pivoted clockwise around the fixing points 3, 3', the length L1 would be shortened and the length L2 would be increased. When calculating the possible shortening during the design process, care has to be taken to ensure that the lower steering arm 1', in its dashed position, cannot hit the rear wheels.

Furthermore, the two side struts 5, 105 have the purpose of holding the attached implement on the longitudinal tractor axis 8 in a centered way, when the attached implement is in the lifted transport condition, for instance. The same applies if no implement is attached and if the lower steering arms 1, 1' are in the transport position. In this condition, the two side struts 5, 105 ensure that the lower steering arms 1, 1' are held so that they cannot move sideways from the set dimension of spread A from the longitudinal tractor axis 8 outwardly towards the rear wheels. The dimension of spread A between the coupling hooks 4 of the two lower steering arms 1, 1' can be manually set. To accomplish this, settable telescopic setting means are integrated into the side struts 5, 105 if implements are to be coupled whose category deviates from the set category.

FIG. 2 shows an enlarged longitudinal section through a side strut 5 of FIG. 1. The side strut 5 comprises a single-action hydraulic cylinder with a cylinder housing 9 and a piston 16. The cylinder housing 9 defines a cylinder chamber 10. At one end, the chamber 10 is closed by a base. At its other end, the chamber 10 has a guiding bore 13 centered on the longitudinal axis 12. An attaching bore 11 leads into the cylinder chamber 10. The attachment bore can be connected to a pressure agent line. For example, the pressure agent line is either hydraulically connected to the lifting mechanism of the tractor for the lower steering arms or it is connected to a separate pressure source with control elements connected therebetween.

The first attaching means 6 is in the form of a ball eye. The ball eye 6 is attached to the cylinder housing 9. At the end of the guiding bore 13, removed from first attaching means 6, a stripper 14 and a seal 15 are arranged, one behind the other. The piston 16 includes a hollow cylinder 17. At one end, the hollow cylinder 17 is closed by a base 18. The base face of the base 18 points towards the interior of the hollow cylinder and has been given the reference number 19. Towards the base 18, the outer face of the hollow cylinder 17 includes a groove. The groove is engaged by a stop ring 23. The ring 23 delimits the outward movement of the piston 16 out of the cylinder housing 9.

FIG. 2 shows the piston 16 in its furthest moved-out position. The piston 16 is supported via the stop ring 23 against a corresponding face in the region of transition between the cylinder chamber 10 and the guiding bore 13. A rod-shaped, especially tube-shaped setting element 20, is positioned in the hollow cylinder 17. The setting element 20 is adjustable along the longitudinal axis 12. FIG. 2 shows the setting element 20 in its moved-in position relative to the piston 16 and the hollow cylinder 17. The setting element 20, by its first end face 21, rests against the base face 19. The setting element 20 is guided relative to the hollow cylinder 17 by two guiding rings 26, 28. The rings 26, 28 are positioned on the outer face 24 of setting element 20. The first guiding ring 26 is arranged near the end of the hollow cylinder 17, which end is removed from the base 18, and guided on the inner face 25 of the hollow cylinder 17. The first guiding ring 26 is also in contact with a securing ring 27 secured in the hollow cylinder 17. Thus, it cannot be moved out of the hollow cylinder 17. The second guiding ring 28 is arranged near the base 18. The second guiding ring 28 is secured to the outer face 24 of the setting element 20 towards the base 18 by a securing ring 29. The second guiding ring 28 is guided on the inner face 25 of the hollow cylinder 17.

A spring 31 is arranged between the two guiding rings 26, 28. The pressure spring 31 loads the setting element 20 towards the base 18. The setting element 20, via its first end face 21, is held in contact with the base face 19. The pressure spring 31 is co-axially arranged around the setting element 20 and the hollow cylinder 17.

The setting element 20 includes a continuous bore which is centered on the longitudinal axis 12. The bore part starts from the second end face 22 of the setting element 20. The bore is in the form of a threaded bore 30. A threaded rod 32 is adjustably positioned in the threaded bore 30. In the moved-in condition of the setting element 20, the threaded bore 30, relative to the hollow cylinder 17, is arranged with part of its length in the hollow cylinder 17. In the moved-in condition, a small part of the setting element 20 axially projects beyond the end of the hollow cylinder 17.

A holding device 35 is attached to the projecting end. An actuating lever 33 is secured to the holding device 35. The actuating lever 33 is pivotable around the pivot axis 34. In the inactive condition shown in FIG. 2, the actuating lever 33 is positioned in the yoke opening 38 between two yoke arms of a first holding element 36. The first holding element 36 is held by the setting element 20. The first holding element 36 holds the setting element 20 non-rotatable relative to the piston 16. Thus, the setting element 20 cannot be rotated around the longitudinal axis 12. Furthermore, the threaded rod 32 carries the second attaching means 7 which attaches to a lower steering arm. The telescopic design achieves an extremely short installation length.

Figure 4:
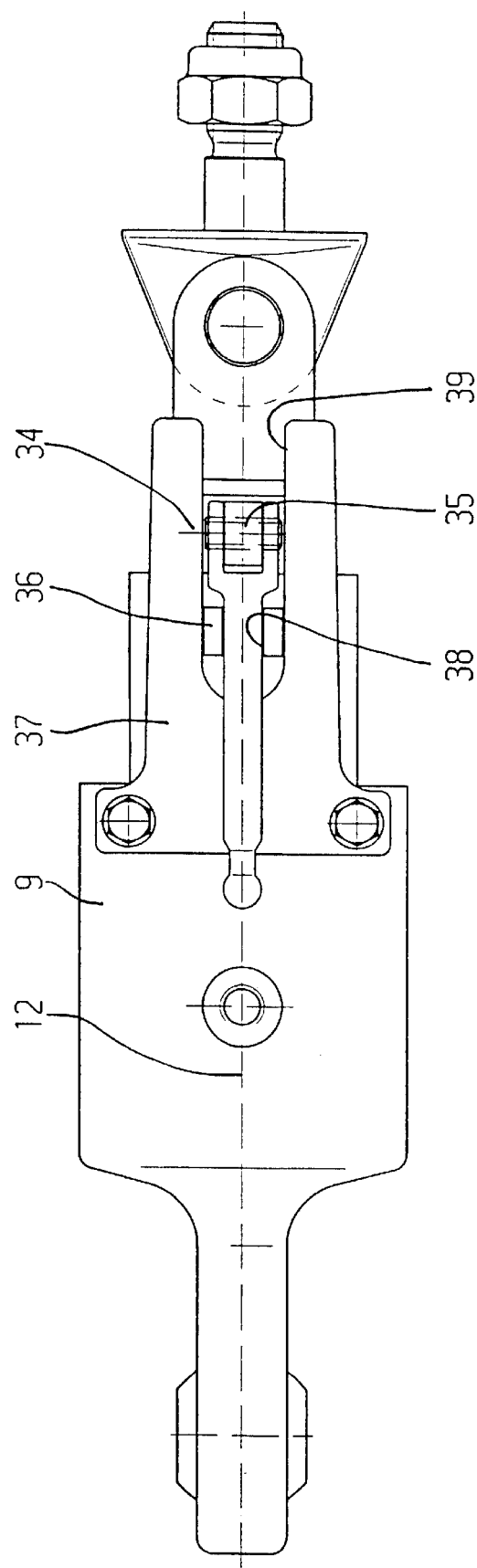
FIG. 4 is a further plan view, with the hydraulic cylinder being in the moved-in position.

The anti-rotation means of the setting element 20 will be described in greater detail with reference to FIGS. 2 to 4. The first holding element 36 is yoke-shaped, with a yoke opening 38 between the yoke arms. The yoke opening 38 is engaged by the actuating lever 33 after being pivoted around the pivot axis 34 towards the outer circumference of the cylinder housing 9 and of the hollow cylinder 17. The setting element 20 is non-rotatably held relative to the hollow cylinder 17. The first holding element 36 is attached to the hollow cylinder 17.

In addition, a second holding element 37, which is made of plate metal, is secured to the end of the cylinder housing 9 removed from the first attaching means 6. The second holding element 37 projects from the end towards the second attaching means 7. The second holding element 37 has a guiding slot 39 which starts from the end removed from the cylinder housing 9. The first holding element 36 is permanently guided by the second holding element 37. In the guiding slot 39, the first holding element carries out a relative movement relative to the second holding element 37 when the piston 16 is moved into or out of the cylinder housing 9.

FIGS. 2 and 3 show the piston 16 in a position where it is fully moved out of the cylinder housing 9. The actuating lever 33 is freely upwardly pivotable around the pivot axis 34 in the clockwise direction. The upwardly pivoted actuating lever 33, which has left the guiding slot 39, can be used to rotate the setting element 20 around the longitudinal axis 12. Thus, depending on the direction of rotation, the threaded rod 32 moves into or out of the setting element 20. As a result, the distance between the attaching means 6, 7 of the side strut 5 changes. If, in the inwardly pivoted, inactive position or position of rest of the actuating lever 33, the piston 16 is moved into the cylinder housing 9. In the position shown in FIG. 4, the actuating lever 33 is introduced far enough into the guiding slot 39 so that, even in the outwardly pivoted condition, the lever cannot be used for rotationally displacing the setting element 20. Thus, when an implement is attached, neither a particular category nor a particular play can be set unless the lower steering arms are in the centered position.

Figure 5:
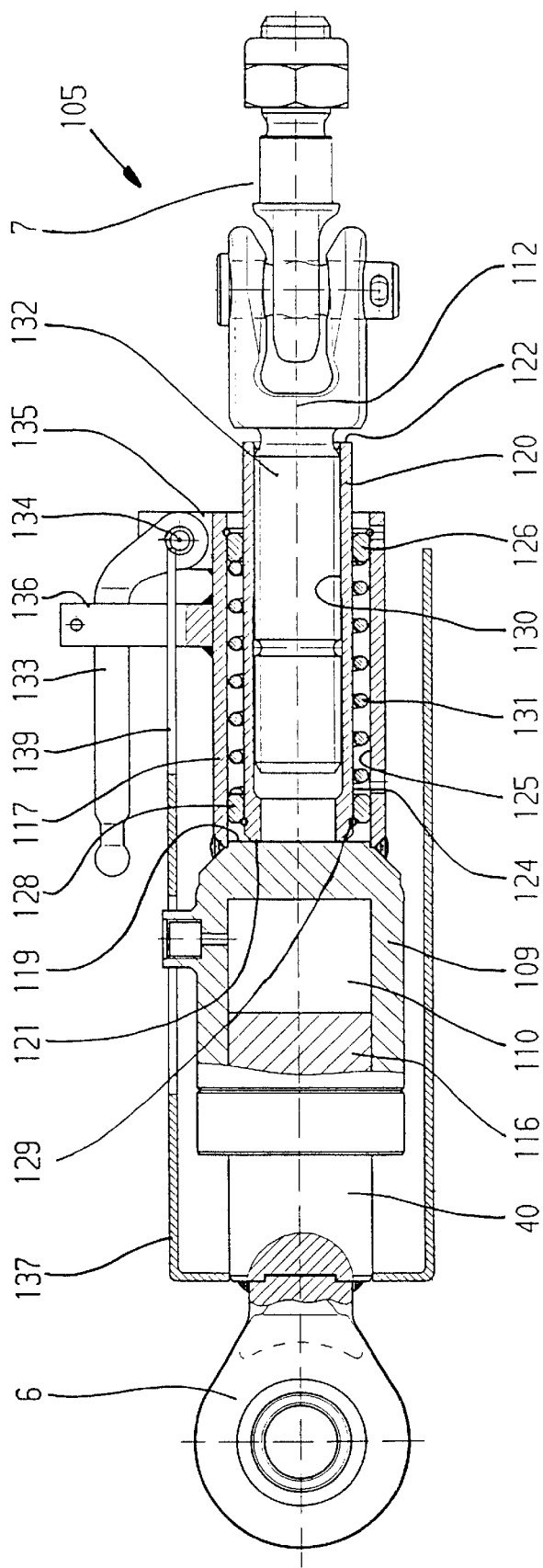
FIG. 5 is a longitudinal section view through an alternate embodiment of a side strut.

FIG. 5 shows a further embodiment of a side strut 105. Components similar to those of the embodiments according to FIGS. 2 to 4 are given reference numbers which are increased by the FIG. 100. To that extent, reference is made to the description of FIG. 2, with substantial differences being described below.

In the side strut 105 according to the second embodiment, the first attaching means 6 are directly connected via the piston rod 40 to the piston 116. The cylinder housing 109 is firmly connected to the hollow cylinder 117. The hollow cylinder 117, while being centered on the longitudinal axis 112, axially follows the cylinder housing 109. As described in connection with FIGS. 2 to 4, the setting element 120 is displacable by the guiding rings 126 and 128 against the force of a pressure spring 131 from a moved-in position, wherein the first end face 121 abuts the base face 119 adjoining the cylinder housing 109, into a moved-out position. A threaded bore 120 is provided in the portion of the setting element 120 which projects from the hollow cylinder 117. The threaded bore 120 starts from the second end face 122. An adjustably positioned threaded rod 132 is threaded into bore 130. The threaded rod 132 carries the second attaching means 7.

The actuating lever 133 is also secured to the setting element 120 by a holding device 135. The lever is held on the setting element 120 so as to be pivotable around a pivot axis 134. The hollow cylinder 117 is provided with a first holding element 136. The holding element 136 is designed as described in connection with FIGS. 2 to 4. FIG. 5 shows the actuating lever 133 in its rest position. Furthermore, the piston 116 is in the fully moved-out position.

The second holding element 137 is tubular and arranged co-axially relative to the hollow cylinder 117 and the cylinder housing 109. The second holding element 137 is secured to the piston rod 40. The second holding element 137 is provided with a guiding slot 139. The guiding slot 139 starts from its end close to the second attaching means 7. The guiding slots 139 extend parallel to the longitudinal axis 112. As described in connection with FIGS. 2 to 4, the guiding slot 139 receives the first holding element 136. Thus, the first holding element is relatively adjustable along the longitudinal axis 112, but non-rotatable in the direction of rotation. When the piston 116 moves into the cylinder housing 109, the actuating lever 133 also enters the guiding slot 139. As a result, any change in the length setting by the threaded rod 132 and the threaded bore 130 is no longer possible. The guiding slot 139 holds the actuating lever 133 even if the latter is pivoted out of its position of rest into an actuating position, so that the setting element 120 is non-rotatable.

As normally the stroke of the piston of the hydraulic cylinder substantially corresponds to the adjustability of the setting element in the hollow cylinder, the setting element is held so as to be non-rotatable even in those cases where it moves out of the hollow cylinder against the force of the pressure spring. This applies to both embodiments.

While the above detailed description describes the preferred embodiment of the present invention, the invention is susceptible to modification, variation and alteration without deviating from the scope and fair meaning of the subjoined claims.

What is claimed is:

1. A side strut for a lower steering arm of a tractor, comprising:
    a single-action hydraulic cylinder with a piston and a cylinder housing;
    a setting unit including a hollow cylinder with a longitudinal axis; a rod-shaped setting element adjustable in the hollow cylinder along the longitudinal axis between a moved-in and a moved-out position, a threaded bore in said setting element centered on the longitudinal axis and starting from a second end face projecting from the hollow cylinder; an actuating lever attached to the end of the setting element projecting from the hollow cylinder; a first holding element attached on the outside to the end of the hollow cylinder removed from the cylinder housing, said actuating lever being brought into an operational relationship preventing rotation of the setting element relative to the hollow cylinder and enabling a relative adjustment of the setting element relative to the hollow cylinder along the longitudinal axis; and
    a threaded rod adjustably received in the threaded bore of the setting element, and a second holding element secured to the hydraulic cylinder, said second holding element holding the first holding element non-rotatable relative to the cylinder and relatively adjustable along the longitudinal axis and in a position deviating from a fully moved-out position of the piston, the second holding element non-rotatably holds the setting element.

2. A side strut according to claim 1, wherein the hollow cylinder forms part of the piston of the hydraulic cylinder.

3. A side strut according to claim 1, wherein the hollow cylinder is connected to the cylinder housing of the hydraulic cylinder.

4. A side strut according to claim 1, wherein the second holding element is attached to the cylinder housing and the first holding element is guided at the second holding element so as to be adjustable along the longitudinal axis and held so as to be non-rotatable around the longitudinal axis.

5. A side strut according to claim 1, wherein the second holding element is secured to the piston and that the first holding element is guided at the second holding element so as to be adjustable along the longitudinal axis and held so as to be non-rotatable around the longitudinal axis.

6. A side strut according to claim 1, wherein the actuating lever is attached to the setting element and is pivotable around a pivot axis which intersects the longitudinal axis at a distance at a right-angle, and said first holding element is shaped to be yoke-like and defines a yoke opening which is engaged by the actuating lever when the lever is in a rest position.

7. A side strut according to claim 4, wherein the actuating lever engages a guiding slot when the piston in the cylinder housing assumes a position which deviates from the fully moved-out position.

8. A side strut according to claim 4, wherein the second holding element includes a guiding slot extending parallel to the longitudinal axis and said first holding element is guided in the guiding slot.

9. A side strut according to claim 4, wherein the second holding element is provided in the form of a plate metal part which is arranged parallel to the longitudinal axis and projects axially from the cylinder housing.

10. A side strut according to claim 4, wherein the second holding element is tubular in shape and coaxially surrounds the hollow cylinder.

11. A side strut according to claim 5, wherein the actuating lever engages a guiding slot when the piston in the cylinder housing assumes a position which deviates from the fully moved-out position.

12. A side strut according to claim 5, wherein the second holding element includes a guiding slot extending parallel to the longitudinal axis and said first holding element is guided in the guiding slot.

13. A side strut according to claim 5, wherein the second holding element is provided in the form of a plate metal part which is arranged parallel to the longitudinal axis and projects axially from the cylinder housing.

14. A side strut according to claim 5, wherein the second holding element is tubular in shape and coaxially surrounds the hollow cylinder.

* * * * *